INVENTOR
ALBERT BOUWERS

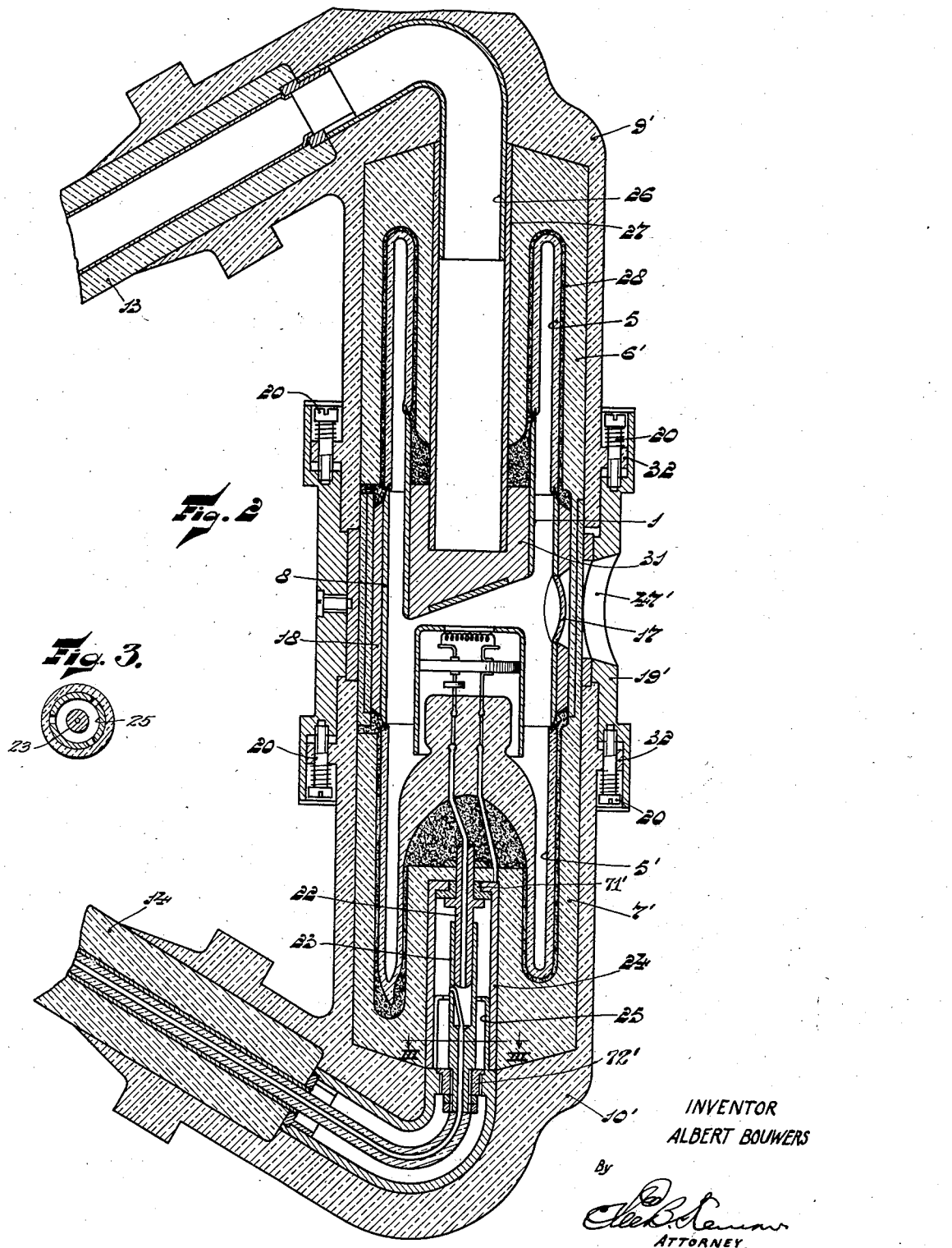

Patented May 31, 1938

2,119,069

UNITED STATES PATENT OFFICE 2,119,069

HIGH VOLTAGE DISCHARGE DEVICE

Albert Bouwers, Eindhoven, Netherlands, assignor to N. V. Philips' Gloeilampenfabrieken, Eindhoven, Netherlands Application June 25, 1934, Serial No. 732,347
In Germany July 21, 1933

6 Claims. (Cl. 250—35)

The present invention relates to high voltage discharge devices which comprise a sealed container, a substantial portion of which is of glass.

My invention will be described in connection with X-ray tubes; however, it should be well understood that it is also applicable to other types of high voltage devices, as cathode ray tubes, rectifier tubes and the like.

Because of the comparative ease of providing for a hermetically sealed container through which the electrodes can be sealed, as well as because of other desirable properties, glass has been generally used as material for the hermetically sealed container of X-ray tubes, and in the large majority of present X-ray tubes the container is entirely or at least has a substantial portion of glass.

Glass, however, as a material for such a container has also certain disadvantages. First of all, when in contact with air the insulating capacity of the surface of glass is reduced, which probably is chiefly due to the forming of a film of moisture. Furthermore, a glass wall is comparatively easily ruptured by an electrical spark due to a high potential difference existing between parts located within and without the tube, with the result that air enters into the tube and makes it useless for further operation.

Besides that, glass is easily breakable.

To avoid some of these difficulties it has been already proposed to make the container of X-ray tubes of glass several times as thick as is usual for such containers. However, such thick-walled glass containers have been found impractical for several reasons. First of all, thick-walled glass containers introduce various manufacturing difficulties; for instance, it is difficult to fuse the electrode to the thick glass wall. Also, with increasing wall thickness the internal strains increase within the glass with the result that a thick-walled container is highly sensitive to temperature variations and readily cracks during the manufacture as well as in the operation of the tube. Besides the above-mentioned disadvantages, the low insulating capacity due to the exposure of glass to air still remains.

My invention overcomes all of the above difficulties. According to my invention I use a container the inside of which consists of a hermetically-sealed vessel consisting entirely or at least partly of glass and having the usual thickness of the order of one or a few millimetres, and provide a second vessel which intimately surrounds the inner vessel, the outer surface of this outer vessel having a much higher insulating capacity when exposed to air than does the inner vessel, and having a thickness adapted to withstand the operating voltage of the tube. For example, various ceramic materials, as porcelain, artificial resin, etc., are suitable materials for the outer vessel. The outer layer may for example be 5 to 10 times thicker than the inner layer. The outer vessel may be enlarged, for example provided with folds or corrugations with the purpose of increasing the insulating capacity of the surface.

To avoid electrostatically-charged spaces between the two vessels, I may in addition provide a suitable filling material, as porcelain cement, to fill out whatever voids may exist between the two vessels.

In such arrangement the thin-walled inner glass vessel retains all of the manufacturing and operating advantages of present-day glass containers, whereas the material of the outer vessel having a much higher insulating capacity when exposed to air than has glass under similar conditions, the danger of surface discharges along the tube is much reduced.

As the wall of the outer vessel is of considerable thickness and in series connection with the glass wall of the inner vessel, there is no danger of the container being electrically ruptured, and the electric stress across the glass layer is quite small at operating voltages. Also the danger of mechanical breakage is reduced.

I am well aware that it has been already proposed to surround X-ray tubes provided with glass containers, by envelopes made of ceramic materials. Such envelopes, however, were not in intimate contact with the glass container, but disposed in spaced relation thereto and served merely as mechanical protection or as protection against stray X-rays, in the latter case also containing X-ray absorbing substances.

Such envelopes, however, do not prevent formation of electrostatically-charged spaces between such envelope and the glass vessel, and air being entrapped between the envelope and the vessel, the surface insulating capacity of the glass is adversely affected.

I am also aware that it has been proposed to apply to the glass container of an X-ray tube an X-ray absorbing glaze, but such coated tubes are difficult to manufacture and the insulating capacity of the outer glass surface is not materially increased by the glazing.

Besides obviating the various difficulties inherent to glass containers, my novel construction has further advantages. As there is less danger of a discharge between the electrodes along the surface of the envelope, or in other words, because for the discharge along the surface of the tube, a much higher voltage is required than in the case of glass tubes, the dimensions of the tube operating at a given voltage can be considerably reduced compared to those of a glass tube.

Furthermore, the high voltage cables of the tube can be directly secured to the thick and mechanically strong outer vessel, which relieves the electrodes and their seals from the weight and pull of these cables.

My invention also embodies various other novel features which, as well as their advantages, will appear as the specification progresses.

In order that the invention may be clearly understood and readily carried into effect two embodiments thereof will be described more fully in connection with the accompanying drawings, in which:

Figure 2 is a longitudinal section of an X-ray tube showing another embodiment of my invention.

Fig. 3 is a cross-sectional view taken along line III—III of Fig. 2.

Figure 1:
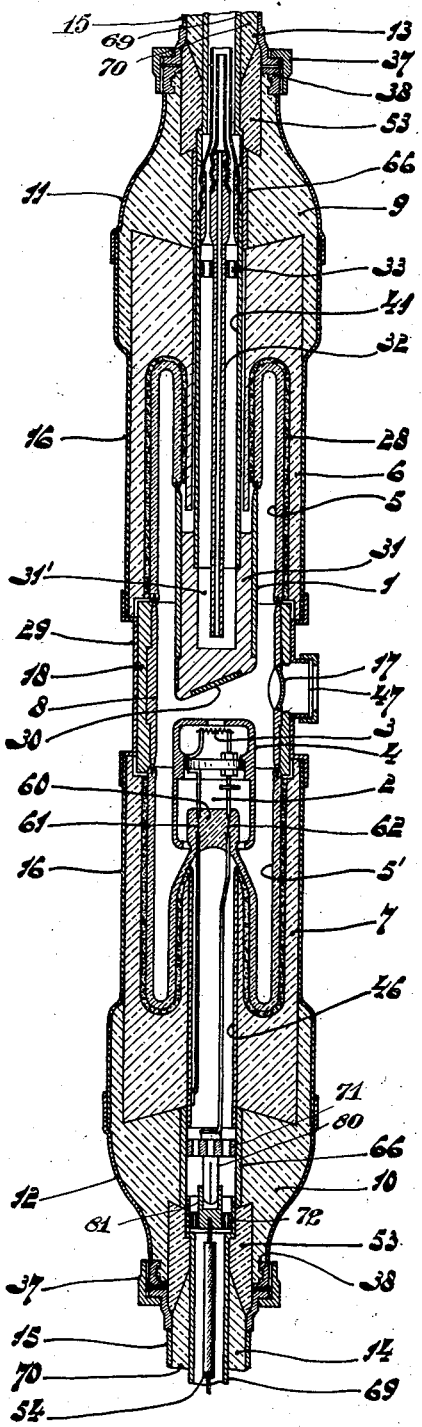
Figure 1 is a longitudinal section of an X-ray tube showing one embodiment of my invention.

Referring to Fig. 1, the X-ray tube comprises an anode structure 1, which together with a cathode structure 2, are hermetically sealed in an evacuated inner vessel, the wall of which consists of two cylindrical members 5—5' having re-entrant portions and made of thin glass and of a central metal sleeve 8.

The metal sleeve 8 is preferably of chrome-iron and fused at its two ends to the abutting edges of the glass portions 5—5'. The sleeve 8 is provided with an aperture for the exit of the X-rays, into which is sealed a glass window 17. The sleeve 8 is surrounded, except at the window portion 17, by a lead coating or jacket 18 which absorbs the stray X-rays.

The anode structure 1 consists of a cylindrical metal body 31 of copper, or other metal of high heat conductivity, and is provided at its frontal surface with a target 30 of tungsten or other refractory metal. The anode body 31 is provided with an axial cavity 31'.

The anode body 31 is fused, preferably by an intermediate member of chrome-iron to the re-entrant portion of the cylindrical glass member 5.

The cathode structure 2 consists of an apertured electrostatic focusing device 4, partly surrounding a filament 3. Lead wires 61—62 for the filament are sealed in the pitch 60 fused to the re-entrant portion of glass member 5'.

Two cup-shaped cylindrical members 6 and 7 of insulating material of considerable thickness and made of artificial resin, for instance the material known under the registered trade-mark "Philite" and provided with a cavity which conforms in shape to the contour of the glass members 5 and 5' respectively, intimately surround these members. The members 6 and 7 may also be made of other insulating materials such as ebonite or a ceramic material, as porcelain. Any voids which may exist between the members 6 and 7, and 5 and 5', respectively, may be filled out with a suitable filling material 28; for example, the material known under the registered trademark "Decouthinsky" cement, so as to avoid electrostatically-charged spaces between these members. Also beeswax, pitch, shellac and the like are suitable filling materials.

As will be readily appreciated by people skilled in the art, the best results will be obtained with filling materials which remain somewhat yielding, so that they are capable of complying with the different coefficient of expansion of the glass and the other insulating material. Usual filling materials which are in a semi-fluid state at elevated temperatures and coagulate above room temperature fulfill this condition.

At the inner ends of the members 6 and 7 is secured a metal sleeve 29 fastened to the lead jacket 18 and is provided with a ray window 47.

A tube 46 of conductive material is axially moulded into the member 7 and is electrically connected to the lead wire 61 of the filament 3.

The lead wire 62 is electrically connected to a plug 80 supported by an insulating member 71.

Hood-shaped members 9 and 10 of an insulating material, of the same material or of material of similar properties to that used for members 6 and 7, tightly fit over the outer ends of the insulating members 6 and 7 respectively and are provided with conductive tubular pieces 66—66 and collars 38—38 for the attachment of high tension cables, as explained hereafter.

Metal sleeves 16—16 surround the insulating pieces 6 and 7 respectively and also part of the hoods 9 and 10 and are mechanically and electrically connected with their inner edges to the ring 29, whereas the remaining portion of hoods 9 and 10 are surrounded by metal hoods 11 and 12 respectively, which are electrically and mechanically connected on one end to the sleeves 16—16 and on the other end to collar member 38—38.

The sleeve 29, sleeves 16—16, and metal pieces 11 and 12 thus provide a continuous metal envelope for the entire assembly, thereby providing for a very robust structure which in addition may be grounded during operation, thus eliminating all danger of electrical shock during operation. Instead of providing metallic sleeve members 11, 12 and 16—16, a metallic coating applied to the members 6, 7, 9 and 10 by spraying or otherwise, may also be used.

Two concentric metal tubings 41 and 32, the first also serving as an electrical connection for the anode, serve as a passageway for the cooling fluid. The tube 32 is axially supported within the tube 41 by an apertured disc 33.

High voltage cables 13 and 14 are provided with hollow conductors 69 and high voltage insulation 70 and with conductive covering 15—15 which is secured to the collar 38 by suitable means, for instance by means of flange nut 37, thus mechanically securing the cables and electrically connecting the covering 15 to the metal coverings 11 and 12. The cathode cable 14 is also provided with a central conductor 54 connected to a socket 81 adapted to receive plug 80 and insulatingly supported from the hollow conductor 69 by an insulating member 72.

Between the conical end of the insulation 70—70 of the cables and the members 9 and 10 respectively, are fitted insulating members 53—53.

Fig. 2 is similar to Fig. 1 except for the following constructional differences: The insulating members 6' and 7' overlap each other at the central portion of the tube and surround the lead sleeve 18. The hoods 9' and 10' have an angular extension to surround the cable ends. Their inner ends extend further toward the center of the tube and are provided with flanges 32—32, which flanges are secured to the central metal ring 19' by means of spring-biased screws 20.

At the anode side of the tube the conductor 26 of cable 13 makes contact with the anode 1 through sleeve 27 and at the cathode side the central conductor of the cable 14 makes contact to one side of the filament by means of sleeve 23, which fits over plug 22, and the second conductor of the cable makes contact with the other side of the filament through the plug 25, which fits into sleeve 24. The plug 22 is insulated from the sleeve 24 by an insulating bushing 71', whereas the sleeve 23 is insulated from the plug 25 by an insulating bushing 72'. The plug 25 is slotted as shown more clearly in Fig. 3.

Preferably an outer metal layer (not shown) covers the insulating hoods 9' and 10' and makes electrical contact with the central metal piece 19', similarly as described in connection with Fig. 1.

As will appear from the figures, the outer vessel extends considerably beyond those portions of the tube at which the electrodes project and thus provides for a long insulating path along its surface between the electrodes.

The inner vessel can be manufactured by known methods, whereas the insulating members of the outer vessel can be formed, for instance molded, in a simple manner. If desired to further increase the surface insulating capacity of the outer vessel, it can be provided with ribs or corrugations.

While I have shown and described certain specific embodiments of my invention I do not desire to be limited thereto, as various other modifications may be possible without departing from the spirit of the invention and the appended claims should be construed as broadly as permissible in view of the prior art.

What I claim is:—

1. As a unitary structure, a high-voltage discharge tube comprising an evacuated envelope having a substantial portion of glass, and electrodes therein, and a protective enclosure for said tube comprising a member of insulating material covering the entire outer surface of the glass portion of said envelope and forming narrow interspaces therewith, and plastic insulating material completely filling the interspaces, the combined insulating capacity of said glass portion, insulating material, and insulating member being sufficient to withstand at least the voltage difference occurring between the inner surface of said glass portion and ground during the operation of the tube.

2. As a unitary structure, a high-voltage discharge tube comprising an evacuated envelope having substantial portions of glass and having electrodes mounted therein, and protective means for said tube comprising interconnected cup-shaped members of a material having a surface insulating capacity in air considerably greater than that of glass, said cup-shaped members covering the entire outer surfaces of the glass portions of the envelope and forming thin interspaces therewith, and plastic insulating material completely filling the interspaces to prevent the occurrence of electrostatically-loaded air spaces.

3. As a unitary structure, a high-voltage discharge tube comprising an evacuated envelope having electrode structures therein, supply leads connected to said electrode structures, said envelope comprising a central metallic portion and two glass portions of substantially cylindrical outer shape fused one to each end of said metallic portion, each of said glass portions having at its free end a reentrant portion carrying one of said electrode structures, and a protective enclosure for said tube comprising two cup-shaped members of insulating material, and a metal member connected to said metallic portion and mechanically interconnecting said cup-shaped members, each of said cup-shaped members fitting over one of the glass portions and forming thin intermediate spaces therewith and having a projecting portion fitting into the corresponding reentrant portion and surrounding said supply leads, and insulating material completely filling said spaces.

4. In combination, a high-voltage discharge tube comprising an evacuated envelope having electrode structures therein, supply leads connected to the electrode structures, said envelope comprising a central metallic portion and two glass portions fused one to each end of said metallic portion, said glass portions having reentrant parts carrying said electrode structures and surrounding said supply leads, and a protective enclosure for said tube comprising two cup-shaped members of insulating material fitting around the glass members, said cup-shaped members having projection portions fitting into the reentrant parts and surrounding the supply leads, a metal member mechanically interconnecting said cup-shaped members, said metal member surrounding said metallic portion and being connected thereto, and insulating filling material between said glass portions and said cup-shaped members to prevent the occurrence of any enclosed air space which would be electrostatically loaded.

5. In combination, an X-ray tube comprising an evacuated envelope having electrodes therein, said envelope having thin-walled glass portions, and protective enclosing means for said tube comprising insulating members snugly fitting the entire outer electrostatically-loaded surfaces of said glass portions, said insulating members being of a solid insulating material other than glass, and an insulating coagulated mass between said insulating members and glass portions and completely filling all interspaces therebetween.

6. As a compact shockproof structure, a high-voltage discharge tube comprising an evacuated envelope having a substantial portion of glass and having electrodes therein, and a protective shockproofing enclosure for said tube comprising a member of insulating material snugly fitting over the entire outer surface of the glass portion and forming thin intermediate spaces therewith, and insulating plastic filling material within said spaces, the combined insulation capacity of said glass portion, filling material, and insulating member being at least sufficient to withstand one-half the operating voltage of the tube.

ALBERT BOUWERS.